(12) United States Patent
Bazin et al.

(10) Patent No.: US 11,110,701 B2
(45) Date of Patent: Sep. 7, 2021

(54) MAIN BODY OF A DOCTOR BLADE CHAMBER, DOCTOR BLADE CHAMBER THEREOF AND METHODS OF MANUFACTURING SAME

(71) Applicants: BOBST LYON, Villeurbanne (FR); EPSILON COMPOSITE, Gaillan (FR)

(72) Inventors: René Bazin, Farnay (FR); Philippe Fleury, Saint Jean des Vignes (FR); Julien Mattrand, Decines-Charpieu (FR); Steve Peter Daniel Willems, Hourtin (FR)

(73) Assignees: BOBST LYON, Villeurbanne (FR); EPSILON COMPOSITE, Gaillan (FR)

( * ) Notice: Subject to any disclaimer, the term of this patent is extended or adjusted under 35 U.S.C. 154(b) by 0 days.

(21) Appl. No.: 16/629,126

(22) PCT Filed: Jul. 6, 2018

(86) PCT No.: PCT/FR2018/051702
§ 371 (c)(1),
(2) Date: Jan. 7, 2020

(87) PCT Pub. No.: WO2019/008295
PCT Pub. Date: Jan. 10, 2019

(65) Prior Publication Data
US 2020/0130348 A1    Apr. 30, 2020

(30) Foreign Application Priority Data

Jul. 7, 2017 (FR) ..................... 17/56404
Jul. 28, 2017 (FR) .................... 17/57253

(51) Int. Cl.
*B41F 31/02* (2006.01)
*B29C 70/52* (2006.01)
*B29L 31/00* (2006.01)

(52) U.S. Cl.
CPC ............ *B41F 31/027* (2013.01); *B29C 70/52* (2013.01); *B29L 2031/767* (2013.01)

(58) Field of Classification Search
CPC ............................ B41F 31/027; B41F 9/065
See application file for complete search history.

(56) References Cited

U.S. PATENT DOCUMENTS

| 7,779,758 B2* | 8/2010 | Wintersgill ........... B41F 31/027 101/350.6 |
| 2009/0266256 A1 | 10/2009 | Rothlein et al. |
| 2018/0178574 A1* | 6/2018 | Larsen .................... B41F 31/04 |

FOREIGN PATENT DOCUMENTS

| CN | 1950207 A | 4/2007 |
| CN | 101570080 A | 11/2009 |

(Continued)

OTHER PUBLICATIONS

Sep. 6, 2018 International Search Report issued in International Patent Application No. PCT/FR2018/051702.

*Primary Examiner* — Leslie J Evanisko
*Assistant Examiner* — Leo T Hinze
(74) *Attorney, Agent, or Firm* — Oliff PLC

(57) ABSTRACT

A main body of doctor blade chambers including a first portion configured to hold a first doctor blade, a second portion configured to hold a second doctor blade, a third portion connecting the first portion and the second portion, a cavity intended to receive ink and defined at least by the first portion, the second portion and the third portion, characterized in that the main body is a single closed hollow profile extending along a longitudinal main axis X-X, the main body being made of pultruded composite material.

9 Claims, 3 Drawing Sheets

(56) References Cited

FOREIGN PATENT DOCUMENTS

| | | |
|---|---|---|
| DE | 11 2006 000 264 T5 | 12/2007 |
| EP | 2 233 391 A1 | 9/2010 |
| FR | 2 881 370 A1 | 8/2006 |
| JP | 2002-241721 A | 8/2002 |
| JP | 2008-514462 A | 5/2008 |
| JP | 2018-519187 A | 7/2018 |
| WO | 2006/035217 A1 | 4/2006 |
| WO | 2016/192735 A1 | 12/2016 |

* cited by examiner

MAIN BODY OF A DOCTOR BLADE CHAMBER, DOCTOR BLADE CHAMBER THEREOF AND METHODS OF MANUFACTURING SAME

TECHNICAL FIELD OF THE INVENTION

The present invention concerns the technical field of doctor blade chambers for flexographic rotary printing units and more particularly the method for manufacturing such a doctor blade chamber and the main body of the doctor blade chamber.

Flexography is a rotary printing process which can be used on many substrates, for example of the sheet or web type, made of cardboard or plastic material, and requiring the use of flexible and relief plates, or printing forms.

In flexography, a printing unit comprises a plate cylinder, configured to carry the printing plate, a screened or anilox roller, having over its surface a plurality of cells intended to collect ink in an amount controlled by the volume of the cells, the screened roller being configured to transfer the ink on the plate, a doctor blade chamber, configured to fill the cells of the screened roller, a pump, ensuring the ink supply from the ink tank to the doctor blade chamber, and an back pressure cylinder holding the media being printed against the plate cylinder.

In FIG. 1 is schematically illustrated this structure of printing units. A printing machine comprises several printing units placed one after the other and each dedicated to a specific color.

In the present invention, the term flexography means a rotary printing method that can be used on many medias and that requires the use of relatively flexible and relief, plates or printing forms.

STATE OF THE ART

Conventionally, a doctor blade chamber is made of metal, preferably aluminum, for manufacturing reasons, the metals can be processed by extrusion.

However, a doctor blade chamber is an element that can reach several meters long and that is, by its volume and the material used to make it, heavy and difficult to handle and transport in particular during maintenance: cleaning, replacement of a part or other.

To facilitate the design and to lighten the doctor blade chamber, the latter is often designed into several parts in particular the main body as described in the document WO2016192735 A1. Nevertheless, the cost of production increases insofar as the number of parts increases to make this main body and the handling of the parts remains difficult, especially since at least one mounting operation is necessary. Furthermore, the gluing and assembly elements come to weigh down the assembled part, which increases the risks related to the collapse and the fatigue of the assembled junctions. In addition, the additional assembly/gluing operations reduce productivity in the process of making the doctor blade chamber. Moreover, these parts are often made by liquid resin injection molding (RTM), which has the drawbacks of obtaining parts whose section thickness is variable and whose fibers compaction is heterogeneous.

OBJECT OF THE INVENTION

The invention aims at overcoming all or part of the aforementioned drawbacks.

An object of the invention is a main body of doctor blade chambers comprising a first portion configured to hold a first doctor blade, a second portion configured to hold a second doctor blade, a third portion connecting the first portion and the second portion, a cavity intended to receive ink and delimited at least by the first portion, the second portion and the third portion, characterized in that the main body is a single hollow closed profile extending according to a longitudinal main axis X-X, the main body being made of a pultruded composite material.

Thanks to the configuration of the main body of the doctor blade chamber according to the invention, the doctor blade chamber is lighter, more robust and resistant due to the use of a pultruded composite material, and the configuration in a single profile avoids the complex and time-consuming, and therefore expensive, mounting/assembly operations. Furthermore, the pultrusion allows obtaining stable mechanical properties and a constant and uniform thickness in all points of the section and over the entire length of the profile. In addition, the pultrusion allows having a piece, in this instance the main body, having a porosity of less than 2% and preferably less than 1%.

In the present invention, pultrusion means a method for continuously manufacturing tubes and profiles made of composite materials.

According to an embodiment of the invention, the main body has a section with a constant thickness. This feature is inherent to the pultrusion method used to make the main body.

According to a feature of the invention, the pultruded composite material comprises thermoplastic fibers and/or aramid fibers and/or glass fibers and/or high modulus carbon fibers and/or high-strength carbon fibers. Preferably, the pultruded composite material is a pultruded composite carbon material.

According to a feature of the invention, the composite material in which the main body is made comprises a fiber volume strictly larger than 60% of the volume of the composite. Preferably, the volume of fiber is between 61% and 70% of the volume of the composite.

Thanks to this composition, the pultruded composite material has a specific modulus corresponding to a ratio between the longitudinal modulus of elasticity or Young's modulus of the composite and the density of the composite, much larger than the specific modulus of a pre-impregnated molded composite material, than that of a pultruded composite material comprising 60% or less of fibers relative to the volume of the composite, and also than that of a composite material molded by low-pressure injection of resin.

Preferably, the pultruded composite material comprises between 61% and 70% of high-strength carbon fibers relative to the volume of the composite material.

TABLE 1

Example of specific modulus results for a composite material with high-strength carbon fibers according to its volume of fibers in the material and the used manufacturing method.

| Used methods | fiber volume in the composite (%) | density (Kg/m$^3$) | Young's modulus (KN/m$^2$) | Specific modulus KNm/kg | performance ratio * |
|---|---|---|---|---|---|
| Low-pressure injection | 50 | 1524 | 120 000 000 | 78740 | 100% |

TABLE 1-continued

Example of specific modulus results for a composite material with high-strength carbon fibers according to its volume of fibers in the material and the used manufacturing method.

| Used methods | fiber volume in the composite (%) | density (Kg/m$^3$) | Young's modulus (KN/m$^2$) | Specific modulus KNm/kg | performance ratio * |
|---|---|---|---|---|---|
| molding of resin | | | | | |
| Molding of prepreg | 56 | 1558 | 130 000 000 | 83440 | 106% |
| Pultrusion | ≤60% | 1581 | 140 000 000 | 88552 | 112% |
| Pultrusion | 65 | 1605 | 149 000 000 | 92835 | 117% |
| Pultrusion | ≥70% | 1632 | 160 000 000 | 98039 | 124% |

* compared to low-pressure injection molding of resin

TABLE 2

Example of specific modulus results for different used materials.

| Used materials | Used Process | fiber volume in the composite (%) | density (Kg/m$^3$) | Young's modulus (KN/m$^2$) | Specific modulus KNm/kg | performance ratio * |
|---|---|---|---|---|---|---|
| Composite material with high-strength carbon fibers | Low-pressure injection molding of resin | 50 | 1524 | 120 000 000 | 78740 | 100% |
| Aluminum | extrusion | N/A | 7850 | 205 000 000 | 26115 | 33% |

* compared to low-pressure injection molding of resin of a composite material comprising 50% of high-strength carbon fibers As shown in the example illustrated in Table 1 hereinabove, the pultruded composite material comprising more than 60% of fibers, has a much greater specific modulus than the specific modulus of a pre-impregnated molded composite material, than that of a pultruded composite material comprising 60% or less of fibers relative to the volume of the composite, and also than that of a composite material molded by low-pressure injection of resin.

According to a feature of the invention, the composite material in which the main body is made by pultrusion with a fiber rate strictly larger than 60%, has a performance ratio higher than 112% compared to the performance ratio of the same composite material in low-pressure injection molding of resin.

According to a feature of the invention, the main body comprises a non-woven fabric integrated in the mass of the main body and arranged flush with the external surface of the main body. The integration of a non-woven fabric at the surface of the main body has the advantage of facilitating the cleaning of the doctor blade chamber in order to avoid a mixture of an ink with residues of the color of the previously used ink. Furthermore, the non-woven fabric allows reducing the surface tension of fluids and developing the qualities of the profile of the main body in particular in machining and in delamination.

Advantageously, the integration of the fabric is carried out at the same time as the making of the main body of the doctor blade chamber.

According to a feature of the invention, the non-woven fabric is a veil with a thickness comprised between 0.05 mm and 1 mm.

According to a feature of the invention, the non-woven fabric at least partially covers a portion of the surface of the main body. Preferably, the non-woven fabric covers at least the surface of the first portion and/or the second portion and/or the third portion of the main body. Even more preferentially, the non-woven fabric covers the entire surface of the main body.

According to a feature of the invention, the non-woven fabric is a fabric comprising at least fibers, for example organic, inorganic or thermoplastic fibers.

According to a feature of the invention, the doctor blade chamber comprises at least one pressurized water channel, arranged in the main body. The purpose of the water channel is to wash the doctor blade chamber and remove residual inks.

According to a feature of the invention, the water channel extends over at least one portion of the length of the main body, preferably over the entire length of the main body. The water channel is housed in the hollow of the main body at the level of the third portion.

According to a feature of the invention, the water channel comprises at least one washing nozzle opening into the cavity of the main body and protruding from the water channel through the third portion of the main body.

Preferably, the water channel comprises a plurality of washing nozzles. Advantageously, the washing nozzles of the plurality are evenly spaced all along the water channel.

According to a feature of the invention, the third portion is set back with respect to the first portion and to the second portion of the main body, so that between the first portion and the second portion a cavity is formed.

According to a feature of the invention, the washing nozzles open into the cavity formed by the first, second and third portions of the main body.

According to a feature of the invention, the first doctor blade and the second doctor blade partially close the cavity formed by the first, second and third portions of the main body. The purpose of the first doctor blade and the second doctor blade is to scrap the screened roller intended to come partially in the doctor blade chamber.

According to a feature of the invention, the main body comprises a first face intended to be opposite the screened roller, and a second face opposite to the first face.

According to a feature of the invention, the water channel is positioned in a hollow of the profile of the main body, a first side of the water channel being arranged against a first internal face of the main body and a second side of the channel of water, opposite to the first side of the water channel being arranged against a second internal face of the main body.

According to a feature of the invention, the water channel is glued to the main body. Advantageously, the gluing of the water channel is made with an expansive glue for sealing. The glue used to glue the water channel is for example a thermosetting glue.

According to a feature of the invention, the water channel is made of a composite material comprising, for example, carbon. According to a feature of the invention, the water channel is a profile.

According to a feature of the invention, the water channel has a substantially rectangular cross-section.

According to a feature of the invention, the doctor blade chamber further comprises an ink channel, extending at least partially along the main body, preferably all along the main body. The purpose of the ink channel is to achieve the inking of the printing unit by flexography.

Advantageously, the ink channel is arranged in the hollow of the profile of the main body, and has at least one ink outlet opening into the ink channel and protruding from the ink channel through the third portion of the main body.

According to a feature of the invention, the ink channel is made of a composite material comprising for example carbon. According to a feature of the invention, the ink channel is a profile.

According to a feature of the invention, the ink channel has a substantially circular cross-section.

According to a feature of the invention, the doctor blade chamber comprises a first end part and a second end part, each end part being arranged at one end of the main body of the doctor blade chamber.

According to a feature of the invention, a portion of the first end part is inserted into a first end of the profile of the main body.

According to a feature of the invention, a portion of the second end part is inserted into a second end of the profile of the main body.

Advantageously, each end part is inserted and then glued into the main body.

According to a feature of the invention, the first end part has at least one orifice shaped so as to house a pipe connecting the water channel to a water tank.

According to a feature of the invention, the first end part has a second orifice shaped so as to house a pipe connecting the ink channel to an ink tank.

Another object of the invention is a method for manufacturing a main body of doctor blade chambers, the manufacturing method being characterized in that it comprises at least one step of pultruding a main body according to the invention.

Another object of the invention is a method for manufacturing a doctor blade chamber according to the invention, the manufacturing method comprising at least one step of obtaining a main body according to the invention by pultrusion.

According to a feature of the invention, the manufacturing method comprises at least one additional step of inserting and assembling, preferably by gluing, a water channel shaped so as to form a water network in the main body of the doctor blade chamber.

According to a feature of the invention, the water channel is assembled preferably glued in the cavity of the profile of the main body and particularly against the first face and the second face of the profile of the main body.

Advantageously, the glue used to glue the water channel is an expandable glue for sealing the assembly.

According to a feature of the invention, the manufacturing method comprises a step of drilling at least one orifice in the main body and in the water channel, the drilling step enabling the subsequent positioning of washing nozzles.

According to a feature of the invention, the manufacturing method further comprises a step of inserting an ink channel within the doctor blade chamber.

According to a feature of the invention, the manufacturing method comprises a step of inserting and assembling, preferably by gluing, a first end part at one end of the main body of the doctor blade chamber and a second end part at the other end of the main body, while connecting the first end part to the water channel and to the ink channel.

BRIEF DESCRIPTION OF THE FIGURES

The invention will be better understood, thanks to the description hereinafter, which relates to an embodiment according to the present invention, provided as a non-limiting example and explained with reference to the appended schematic figures, in which identical reference numerals correspond to structurally and/or functionally identical or similar elements. The appended schematic figures are listed hereinbelow.

DETAILED DESCRIPTION OF THE FIGURES

Figure 1:
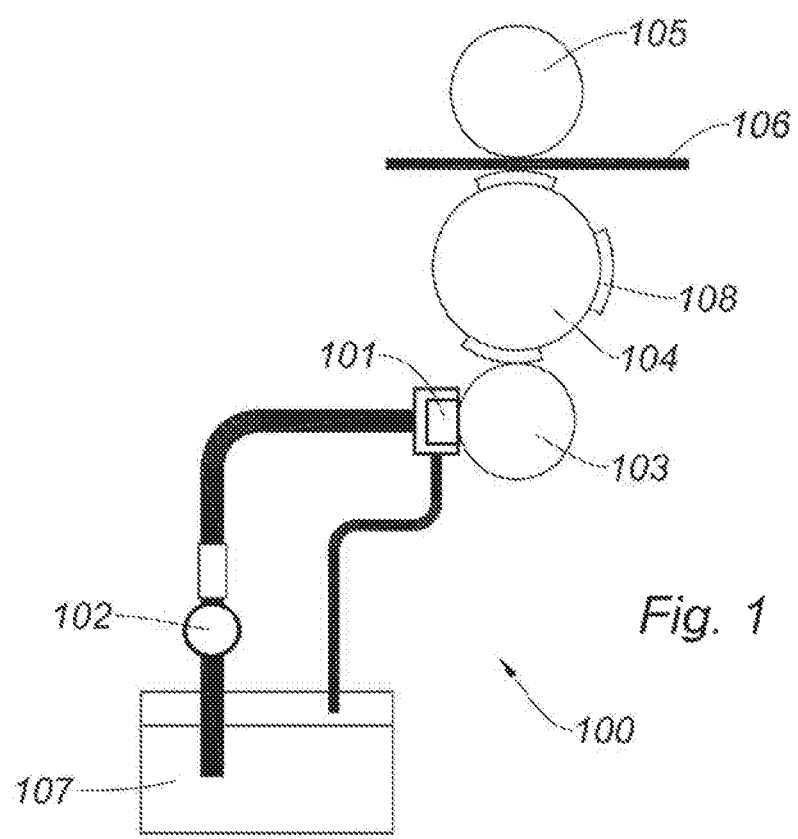
FIG. 1 is a schematic illustration of a flexographic printing unit comprising a conventional doctor blade chamber.

As described above to illustrate the context of the invention, a printing unit 100 comprises:
- a plate cylinder 104 configured to support a plate or printing form 108,
- a screened or anilox roller 103, having over its surface a plurality of cells intended to collect ink in an amount controlled by the volume of the cells, the screened roller 103 being configured to transfer the ink onto the plate 108,
- a doctor blade chamber 101, configured to fill the cells of the screened roller 103,
- a pump 102, ensuring the ink supply from the ink tank 107 to the doctor blade chamber 101, and
- a back pressure cylinder 105 holding the support being printed 106 against the plate cylinder 104, and thus against the plate 108.

The doctor blade chamber of the invention is designated by the reference numeral 1 and is illustrated in detail with reference to FIGS. 2 to 7.

Figure 2:
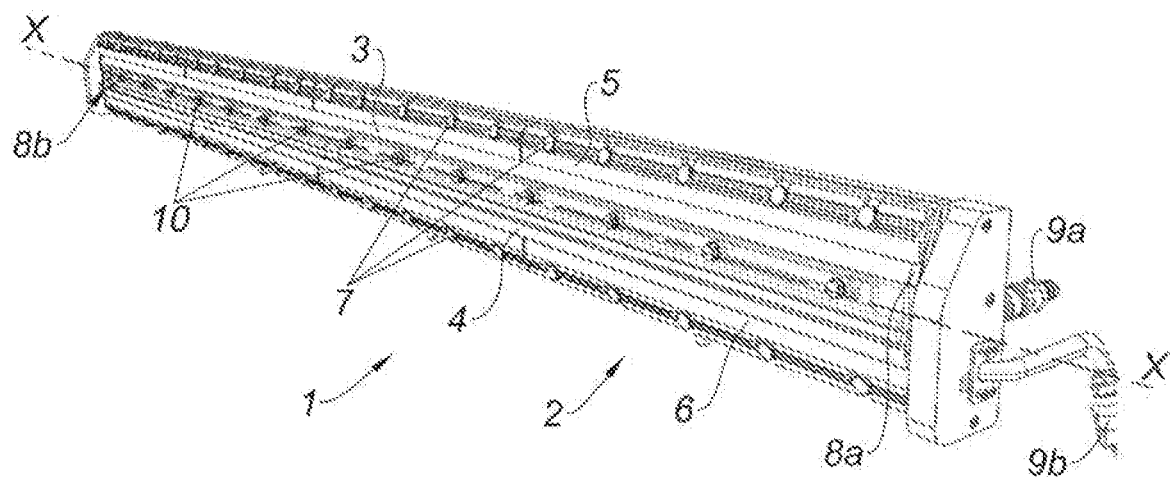
FIG. 2 is a perspective view of the doctor blade chamber according to the invention.
Figure 3:
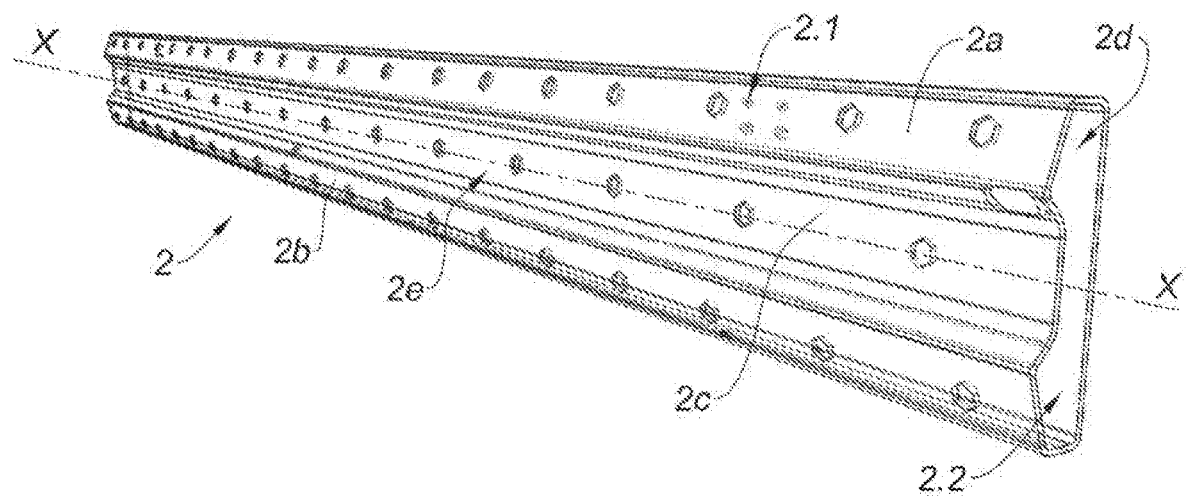
FIG. 3 is a perspective view of the main body of the doctor blade chamber according to the invention and as illustrated in FIG. 2.
Figure 4:
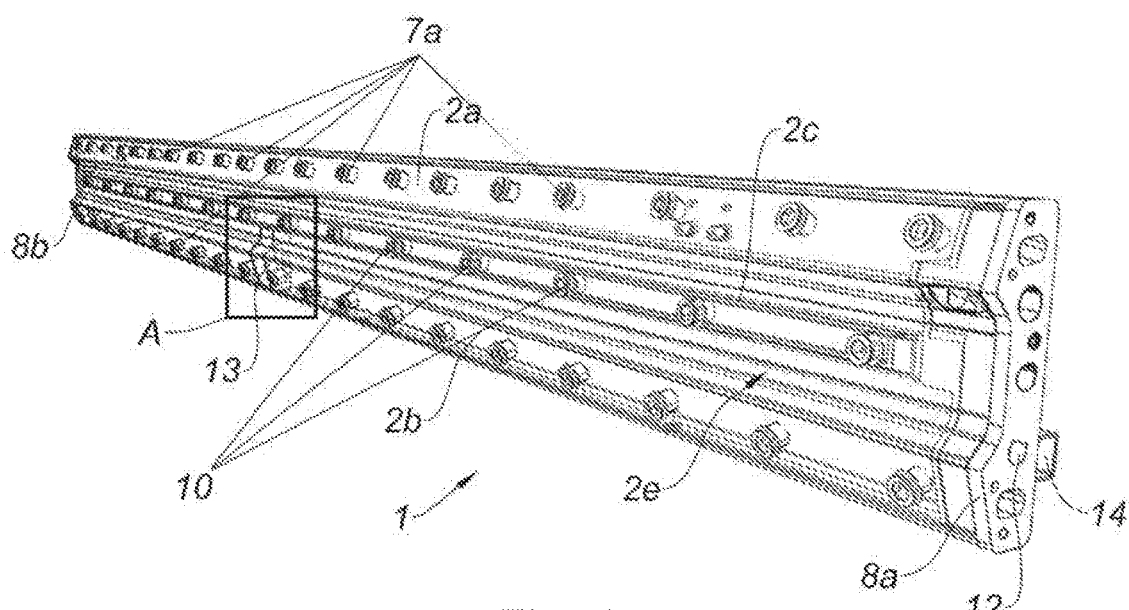
FIG. 4 is a partial perspective view of the doctor blade chamber according to the invention and as illustrated in FIGS. 2 and 3.
Figure 5:
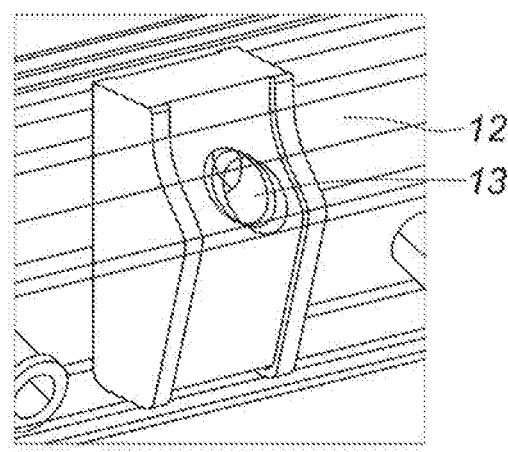
FIG. 5 is a detail view according to box A of FIG. 4.
Figure 6:
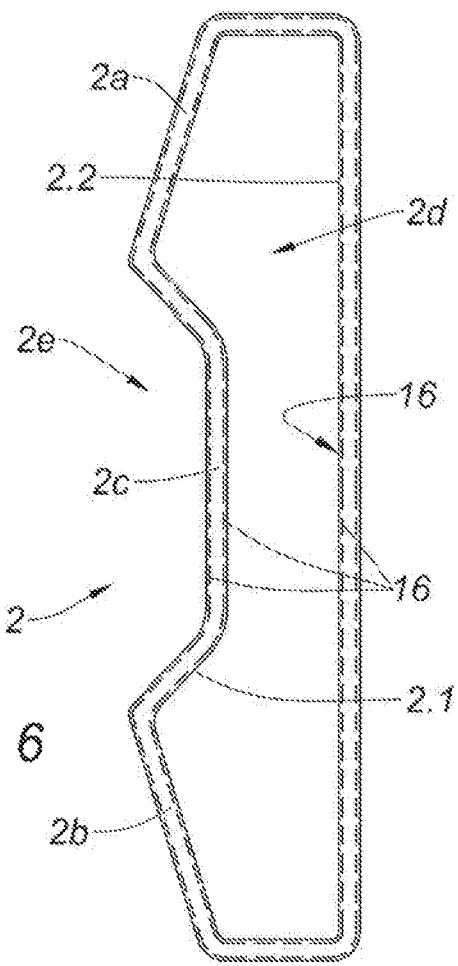
FIG. 6 is a partial detail view of the doctor blade chamber according to the invention and as illustrated in FIGS. 2 to 5.

The doctor blade chamber 1 according to the invention comprises a main body 2 made in one-piece which is a closed hollow profile, as illustrated in particular in FIG. 3. The main body 2 has a constant and uniform thickness in all points of the section and over the entire length of the profile, as illustrated in particular in FIGS. 3, 6 and 7. The main body 2 extends according to a longitudinal main axis X-X as illustrated in particular in FIGS. 2 and 3. Furthermore, the main body 2 is made of pultruded composite carbon.

As shown in FIG. 3, the main body 2 has a first portion 2a, a second portion 2b and a third portion 2c. The third portion 2c connects the first portion 2a and the second portion 2b, the third portion 2c being shaped and intended to partially receive a screened roller therewithin. As shown in FIG. 3, the third portion 2c is set back with respect to the first portion 2a and to the second portion 2b of the main body 2, so that between the first portion and the second portion, a cavity 2e is formed.

Furthermore, the main body 2 has a first face 2.1 intended to be opposite the screened roller and a second face 2.2 opposite to the first face 2.1 as illustrated in FIG. 3.

Figure 7:
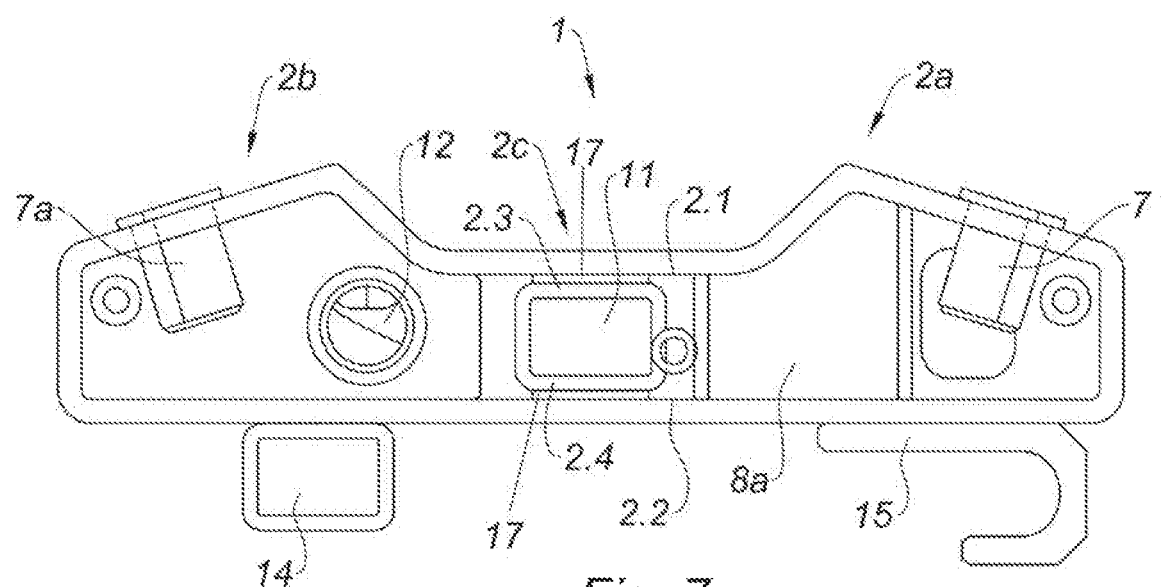
FIG. 7 is a side view of the main body of the doctor blade chamber according to the invention.

According to the invention, the doctor blade chamber 1 further comprises a first doctor blade 3, the first doctor blade 3 being mounted on the first portion 2a of the main body 2 by means of a first doctor blade flange 5 as represented in FIGS. 2 and 7. Each flange is held by a fastening system 7 consisting of the cooperation of a screw or a pin, shown in FIG. 2 with an insert 7a and shown in FIGS. 4 and 7 for example. In addition, the doctor blade chamber 1 comprises a second doctor blade 4, the second doctor blade 4 being mounted on the second portion 2b of the main body 2, opposite the first doctor blade 3, by means of a second doctor blade flange 6 as represented in FIGS. 2 and 7. In the example illustrated in FIGS. 2 and 7, the first doctor blade 3 and the second doctor blade 4 partly close the cavity 2e formed by the first 2a, second 2b and third 2c portions of the main body 2.

According to the invention, the main body 2 comprises a non-woven fabric 16 arranged on the surface of the main body 2 as represented in solid line in FIG. 7. In the example illustrated in FIG. 7, the non-woven fabric 16 is represented as covering the entire surface of the main body 2 but, in variants which are not represented, the non-woven fabric could cover only one portion of the main body 2 for example only the first face 2.1 or only the second face 2.2 or only one of the portions 2a, 2b, 2c of the main body 2.

According to the invention, and as represented in particular in FIG. 7, the doctor blade chamber 1 comprises a pressurized water channel 11, arranged in the main body 2 and more specifically in the hollow 2d of the profile of the main body 2 at the level of the third portion 2c. The water channel 11 advantageously extends over the entire length of the main body 2. Advantageously, the water channel 11 is a profile with a substantially rectangular cross-section.

As shown in FIG. 7, a first side 2.3 of the water channel 11 is arranged against the first internal face 2.1 of the main body 2 and a second side 2.4 of the water channel 11, opposite to the first side of the channel of water 11 is arranged against the second internal face 2.2 of the main body 2.

According to the invention, the water channel 11 comprises at least one plurality of washing nozzles 10 opening into the water channel 11 and protruding from the water channel 11 through the third portion 2c of the body main 2 as illustrated in FIGS. 2 and 7. In the example illustrated in FIG. 7, the water channel 11 is glued in the main body 2 by means of an expansive glue 17 for sealing. Advantageously, the washing nozzles 10 of the plurality are evenly spaced all along the water channel 11. As shown in FIG. 7, the washing nozzles 10 open into the cavity 2e formed by the first, second and third portions 2a, 2b, 2c of the main body 2.

Moreover, the doctor blade chamber 1 according to the invention comprises an ink channel 12, extending all along the main body 2 and arranged in the hollow 2d of the profile of the main body 2. The ink channel 12 comprises at least one ink outlet 13 illustrated in FIG. 6 opening into the ink channel 12 and protruding from the ink channel 12 through the third portion 2c of the main body 2. Advantageously, the ink channel 12 is a profile with a substantially circular cross-section.

According to the invention, the doctor blade chamber comprises a first end part 8a and a second end part 8b, each end part 8a, 8b being arranged at one end of the main body 2 of the doctor blade chamber 1. As shown in particular in FIG. 4, a portion of the first end part 8a is inserted into a first end of the profile of the main body 2 and a portion of the second end part 8b is inserted into a second end of the profile of the main body 2.

Advantageously, the first end part 8a has at least one orifice shaped so as to house a pipe 9a connecting the water channel 11 to a water tank and a second orifice shaped so as to house a pipe 9b connecting the ink channel 12 to an ink tank as illustrated in FIGS. 7 and 2.

Moreover, the doctor blade chamber 1 comprises a supporting element 14 illustrated in FIGS. 2 to 5 and 7 arranged on the second face 2.2 of the main body 2 and configured to strengthen the doctor blade chamber 1. In addition, the doctor blade chamber 1 comprises a hook 15 intended to enable the hooking of the doctor blade chamber system 1.

Of course, the invention is not limited to the embodiment described and represented in the appended figures. Modifications are still possible, in particular with regards to the constitution of the various elements or by substitution with technical equivalents, yet without departing from the scope of the invention.

The invention claimed is:
1. A main body of a doctor blade chamber comprising:
a single hollow closed profile delimited by a first portion configured to hold a first doctor blade, a second portion configured to hold a second doctor blade, and a third portion connecting the first portion and the second portion, the single hollow closed profile extending according to a longitudinal main axis X-X of the main body, the single hollow closed profile being made of a pultruded composite material,
a cavity outside of the single hollow closed profile intended to receive ink and delimited at least by a part of the first portion, a part of the second portion, and the third portion,
a water channel that is positioned in a hollow of the single hollow closed profile and extending along the longitudinal main axis X-X, and
at least one washing nozzle opening into the water channel and protruding from the water channel through the third portion of the single hollow closed profile.
2. The main body according to claim 1, wherein the composite material is a pultruded composite carbon.
3. The main body according to claim 1, wherein the composite material comprises a fiber volume strictly larger than 60% of the volume of the composite.
4. The main body according to claim 3, wherein the fiber volume is between 61% and 70% of the volume of the composite.
5. The main body according to claim 1, comprising a non-woven fabric arranged on a surface of the main body, the non-woven fabric being integrated into the mass of the main body.

6. The main body according to claim 1, wherein the composite material in which the main body is made by pultrusion with a fiber rate strictly higher than 60%, has a performance ratio higher than 112% compared to the performance ratio of the same composite material in low-pressure resin injection molding.

7. A doctor blade chamber comprising:
- a main body according to claim 1,
- a first doctor blade mounted on a first portion of the main body,
- a second doctor blade mounted on a second portion of the main body, opposite the first doctor blade.

8. The doctor blade chamber according to claim 7, wherein a first side of the water channel is arranged against a first internal face of the single hollow closed profile and a second side of the water channel, opposite to the first side of the water channel, is arranged against a second internal face of the single hollow closed profile.

9. The doctor blade chamber according to claim 7, wherein the water channel is a profile made of a composite material comprising carbon.

\* \* \* \* \*